United States Patent [19]
Hsich

[11] Patent Number: 5,931,201
[45] Date of Patent: Aug. 3, 1999

[54] MULTI-LAYER TUBING ASSEMBLY FOR FLUID AND VAPOR HANDLING SYSTEMS

[75] Inventor: Henry S. Hsich, Cary, N.C.

[73] Assignee: Bundy Corporation, Warren, Mich.

[21] Appl. No.: 08/676,728

[22] Filed: Jul. 8, 1996

Related U.S. Application Data

[63] Continuation-in-part of application No. 08/593,068, Jan. 29, 1996.

[51] Int. Cl.$^6$ ........................................ F16L 11/04
[52] U.S. Cl. .......................... 138/137; 138/141; 138/140; 138/DIG. 1
[58] Field of Search ................................... 138/137, 140, 138/141, DIG. 1, DIG. 3, DIG. 7

[56] References Cited

U.S. PATENT DOCUMENTS

| | | | |
|---|---|---|---|
| 3,070,132 | 12/1962 | Sheridan | 138/103 |
| 3,166,688 | 1/1965 | Rowand et al. | |
| 3,473,087 | 10/1969 | Slade | 138/103 |
| 3,561,493 | 2/1971 | Maillard | 138/141 |
| 3,907,955 | 9/1975 | Viennot | 264/105 |
| 4,643,927 | 2/1987 | Luecke et al. | 428/36 |
| 4,706,713 | 11/1987 | Sadamitsu et al. | 138/137 |
| 4,887,647 | 12/1989 | Igarashi et al. | 138/126 |
| 5,038,833 | 8/1991 | Brunnhofer | 138/137 |
| 5,076,329 | 12/1991 | Brunnhofer | 138/137 |
| 5,142,782 | 9/1992 | Martucci | 138/125 X |
| 5,170,011 | 12/1992 | Martucci | 138/118 X |
| 5,284,184 | 2/1994 | Noone et al. | 138/121 |
| 5,383,087 | 1/1995 | Noone et al. | 138/137 |
| 5,419,374 | 5/1995 | Nawrot et al. | 138/137 |
| 5,460,771 | 10/1995 | Mitchell et al. | 264/508 |
| 5,469,892 | 11/1995 | Noone et al. | 138/121 |
| 5,524,673 | 6/1996 | Noone et al. | 138/137 X |
| 5,554,425 | 9/1996 | Krause et al. | 138/137 X |
| 5,566,720 | 10/1996 | Cheney et al. | 138/137 |
| 5,653,266 | 8/1997 | Reynolds et al. | 138/137 |

FOREIGN PATENT DOCUMENTS

| | | |
|---|---|---|
| 0551094 | 7/1993 | European Pat. Off. |
| WO9321466 | 10/1993 | WIPO |
| WO9325835 | 12/1993 | WIPO |
| WO9409303 | 4/1994 | WIPO |
| WO9523036 | 8/1995 | WIPO |

OTHER PUBLICATIONS

Thermodynamically reversible and irreversible Control on Morphology of Multiphase Systems, Journal of Materials Science 25, Chapman and Hall, Ltd, 1990.

Phase separation mechanism of rubber–modified epoxy, Journal of Materials Science 25, 1990.

Morphology and Properties Control on Rubber–Epoxy Alloy Systems, Polymer Engineering and Science, May 1990.

Phase Diagrams of Rubber–Modified Epoxies by Rayleigh–Brillouin Scattering and Thermodynamically Reversible and Irreversible Control on Morphology of Multiphase Systems, 34th International SAMPE Symposium, May 1989.

Henry S. Hsich, "Morphology and Property Control via Phase Separation or Phase Dissolution during Cure in Multiphase Systems", pp. 185–203, published Jan. 1991 in Advances in Polymer Technology, vol. 10, No 3.

*Primary Examiner*—Patrick Brinson
*Attorney, Agent, or Firm*—Dorn, McEachran, Jambor & Keating

[57] ABSTRACT

A multi-layer tubing assembly for use in fuel-line applications. An extruded innermost semi-conductive layer of a fluoroplastic has a surface resistivity in the range of $10^1$ to $10^6$ ohm/sq. An inner permeation-resistant layer of a fluoroplastic is coextruded around the innermost layer at temperatures below 600 degrees Fahrenheit. An adhesive layer of polymer blend coextruded around the inner layer has a multiphase morphology wherein one phase is miscible with the fluoroplastic and another phase is miscible with a rubber-like multiphase polymer. A cover layer of the rubber-like multiphase polymer is coextruded around the adhesive layer.

33 Claims, No Drawings

MULTI-LAYER TUBING ASSEMBLY FOR FLUID AND VAPOR HANDLING SYSTEMS

This application is a continuation-in-part of copending application Ser. No. 08/593,068, filed on Jan. 29, 1996.

BACKGROUND OF THE INVENTION

The present invention relates to multi-layer tubing for fluid and vapor handling systems. More specifically, it relates to coextruded multi-layer tubing assemblies for use in automotive fuel line applications having one or more inner fluoroplastic layers, a middle adhesive layer, and a rubber-like multiphase polymer cover layer.

Tubing assemblies for the transport of liquids and vapors are well known in the art. In fuel-line applications, tubing assemblies are exposed to a variety of deleterious and harmful conditions. The tubing is in nearly constant contact with fuel and other automotive fluids and additives. Also, there are external environmental factors such as stone impact and corrosive media (such as salt) to consider. Furthermore, engine temperatures often rise to extremely high levels, and in cold climates, there is exposure to extremely low temperatures as well.

This abundance of considerations has led to design of tubing assemblies having multiple layers. The materials of each layer have specific, and preferably complementary properties. Inner tubing layers, for example, are typically designed to be resistant to permeation by liquids and gases, while outer layers possess mechanical strength and shock resistance.

The art contains numerous examples of multi-layer tubing assemblies. U.S. Pat. No. 3,561,493 to Maillard discloses a tubing assembly having two coextruded layers of different plastics, and a coextruded layer of adhesive therebetween. The layers are chosen from plastics having complementary properties. U.S. Pat. No. 4,643,927 to Luecke et al. discloses a tubing assembly having a central barrier layer of polyvinylidene chloride that is relatively gas impermeable. The barrier layer is surrounded by inner and outer adhesive layers which in turn are surrounded by inner and outer surface layers of polyethylene that protect the central barrier layer from degradation. U.S. Pat. No. 4,887,647 to Igarishi et al. shows a multi-layer tubing assembly having an inner fluoro rubber layer that prevents degradation due to amine-type additives and also exhibits improved adhesion to an outside rubber layer. U.S. Pat. No. 5,038,833 to Brunnhofer discloses a tubing assembly having a protective outer polyamide layer, a middle alcohol barrier layer of polyvinyl-alcohol, and an inner water barrier layer of polyamide. U.S. Pat. No. 5,076,329 to Brunnhofer shows a five-layer tubing assembly having outer, inner and middle layers of nylon, and intermediate bonding and solvent-blocking layers.

Another requirement for fuel lines is provision for discharge of internal static electricity. Accumulated, undissipated electric charge can eventually cause a breach in a fuel line. U.S. Pat. Nos. 3,166,688 to Rowand et al. and 3,473,087 to Slade disclose polytetrafluoroethylene (PTFE) tubing assemblies having electrically conductive inner layers to facilitate dissipation of static electrical energy.

More recent developments in multi-layer tubing design have been motivated by governmental regulations limiting permissible hydrocarbon emissions. It is known that fluoropolymers exhibit good permeation resistance to hydrocarbon fuels. Hence, recent multi-layer tubing assemblies have usually included at least one permeation-resistant fluoropolymer layer. Difficulties have been encountered, however, in finding a commercially viable design. Multi-layer tubing assemblies utilizing fluoropolymers tend to be rigid and inflexible, particularly at low temperatures. Fluoropolymers having strong mechanical properties typically do not bond well with other non-fluoropolymers. Conversely, fluoropolymers exhibiting good bondability (polyvinylidene fluoride (PVDF), in particular) tend to be mechanically weak.

U.S. Pat. No. 5,383,087 to Noone et al. is a recent example. It includes an outer impact-resistant polyamide layer, an intermediate bonding layer, an inner permeation-resistant PVDF layer, and an innermost conductive PVDF layer for dissipation of electrostatic charge. All layers are coextruded. The innermost conductive layer exhibits an exceptional electrostatic dissipation capacity in the range of $10^{-4}$ to $10^{-9}$ ohm/cm$^2$. Materials possessing such extremely high conductivity, however, are typically metallic or brittle plastic. Consequently, they are difficult to extrude and also exhibit poor mechanical properties. Furthermore, most of the fluoropolymers disclosed in the '087 patent bond poorly with dissimilar polymers.

The fluoropolymer bonding problem is addressed in U.S. Pat. No. 5,419,374 to Nawrot et al. Nawrot et al. disclose multi-layer coextruded tubing assembly having an outer layer of polyamide 12, an inner PVDF layer, and a middle adhesion binder layer (a mixture of polyurethane and ethylene/vinyl acetate copolymer). Though, as discussed above, PVDF demonstrates better adhesion to the polyamide layer, PVDF multi-layer tubing suffers from poor cold impact-resistance. This is due to the fact that PVDF becomes brittle at low temperatures.

Other high performance fluoropolymers, such as ethylene tetrafluoroethylene (ETFE), exhibit better cold impact-resistance but again, have experienced bonding problems. One approach in the art has been to pretreat the ETFE surface using methods such as chemical etching, plasma discharge or corona discharge. European Patent Application publication no. 0 551 094, for example, discloses a multi-layer tubing assembly in which an inner ETFE layer is treated by corona discharge to enhance bonding to an outer polyamide layer. Similarly, PCT international application WO 95/23036 treats an inner ETFE layer with plasma discharge to achieve better bonding with an outer thermo-setting elastomer layer. In the same vein, U.S. Pat. No. 5,170,011 etches a fluorocarbon inner layer to promote better bonding with a polyamide outer layer. These approaches, too, have their problems. Pretreatment processes such as corona and plasma discharge are expensive and can be environmentally hazardous. Furthermore, in many cases (such as with corona treatment), only temporary bonding is achieved and delamination may occur with aging.

Another approach has been to utilize multi-layer tubing assemblies having fluoroelastomer permeation-resistant layers and non-fluoroelastomer cover layers. U.S. Pat. Nos. 4,842,024, 4,905,736, 5,093,166 and 5,346,681 are exemplary. More recently, fluoroplastics have been used as a permeation-resistant layer along with non-fluoroelastomers or polyolefin thermoplastic elastomers as a cover layer. These approaches, however, require a two-step cross-head extrusion process and may also require a vulcanization process. Such processes are expensive and slow, and the mechanical strength and cold impact resistance of the resulting tubing is poor.

SUMMARY OF THE INVENTION

The present invention provides a coextruded multi-layer tubing assembly having an inner fluoroplastic permeation-resistant layer, a middle adhesive layer, and a non-vulcanized rubber-like multiphase polymer cover layer. The adhesive layer is a polymer blend or alloy that has a specific morphology for promoting adhesion. The tubing may also have an innermost semi-conductive fluoroplastic layer. A semi-conductive layer, rather than a highly conductive layer as disclosed in U.S. Pat. No. 5,383,087, provides better mechanical properties and is more suitable for coextrusion.

Past multi-layer tubing assemblies having a plastic-like layer and a rubber-like layer could be achieved only by a two-step cross-head extrusion process. The multi-layer tubing assembly of the present invention has plastic-like and rubber-like layers that are coextruded in one step and have good adhesion therebetween.

DETAILED DESCRIPTION OF THE PREFERRED EMBODIMENTS

A first embodiment of the present invention is a four-layer tubing assembly for use in liquid fuel-line applications. It includes an extruded innermost semi-conductive fluoroplastic layer. The fluoroplastic is made semi-conductive by mixing it with 1% to 10% by weight of conductive carbon black. Metallic conductive fillers such as silver, copper or steel may also be utilized. It has a surface resistivity in the range of about $10^1$ to $10^6$ ohm/sq., with a preferential range of $10^2$ to $10^5$ ohm/sq. Suitable fluoroplastics include ETFE (ethylene tetrafluoroethylene), THV (a terpolymer of tetrafluoroethylene, hexafluoropropylene and vinylidene fluoride), PVDF (polyvinylidene fluoride) or blends of these fluoroplastics.

An inner permeation-resistant fluoroplastic layer coextrudable at temperatures below 600 degrees Fahrenheit is coextruded with and surrounds the innermost semi-conductive layer. The importance of this layer being extrudable at temperatures below 600 degrees Fahrenheit resides in the fact that the some materials contained in the cover and/or outer layers, such as polyamides, must be extruded at temperatures below 600 degrees Fahrenheit. Temperatures above 600 degrees Fahrenheit may liquefy materials such as polyamides and make them unsuitable for extrusion. Fluoroplastics suitable for the permeation-resistant layer are the same as those fluoroplastics identified as suitable for the semi-conductive layer.

An adhesive layer is coextruded around the inner permeation-resistant layer. The adhesive is a polymer blend or alloy that has a multi-phase morphology wherein one phase is compatible or miscible with the fluoroplastic utilized in the inner tubing layers, and another phase is compatible or miscible with the rubber-like multiphase polymer utilized in the cover layer. Morphology development and mechanisms of phase separation in polymer alloys and blends is known and is described in the inventor's prior art publication, "Morphology and Property Control via Phase Separation or Phase Dissolution during Cure in Multiphase Systems", Advances in Polymer Technology, Vol. 10, No. 3, pp. 185–203 (1990).

A flexible rubber-like multiphase polymer cover layer is coextruded around the adhesive layer. Suitable multiphase polymers include polymer blends or alloys of polyamides, polyesters, polyurethane and matallocene polyolefins. These polymers are rubber-like and have hardnesses in the range of Shore A 50–98 and tensile strengths in the range of 3000–6000 psi (20–40 MPa). There is no requirement of vulcanization.

A second embodiment of the present invention is a three-layer tubing assembly for use in liquid fuel-line applications. It includes an extruded inner semi-conductive and permeation-resistant fluoroplastic layer. The fluoroplastic is made semi-conductive by mixing it with 1% to 10% by weight of conductive carbon black. It has a surface resistivity in the range of about $10^2$ to $10^6$ ohm/sq., with a preferential range of $10^3$ to $10^5$ ohm/sq. The fluoroplastic can undergo extrusion at temperatures below 600 degrees Fahrenheit. Suitable fluoroplastics are the same as those fluoroplastics identified as suitable in the first embodiment.

An adhesive layer is coextruded around the inner permeation-resistant layer. The adhesive, as in the first embodiment, is a polymer blend or alloy that has a multi-phase morphology wherein one phase is compatible or miscible with the utilized fluoroplastic, and another phase is compatible or miscible with the utilized rubber-like multiphase polymer. A rubber-like multiphase polymer cover layer is coextruded around the adhesive layer. Suitable multiphase polymers are the same as those identified as suitable for the first embodiment.

A third embodiment of the present invention is a three-layer tubing assembly for use in vapor fuel-line applications. It includes an extruded inner permeation-resistant fluoroplastic layer. The fluoroplastic is extrudable at temperatures below 600 degrees Fahrenheit. Suitable fluoroplastics are the same as those identified above.

An adhesive layer is coextruded around the inner permeation-resistant layer. The adhesive, as in the first and second embodiments, is a polymer blend or alloy that has a multi-phase morphology wherein one phase is compatible or miscible with fluoroplastic and another phase is compatible or miscible with a rubber-like multiphase polymer.

A rubber-like multiphase polymer cover layer is coextruded around the adhesive layer. Suitable multiphase polymers are the same as those identified above.

A fourth embodiment of the present invention is a four-layer tubing assembly for use in vapor fuel-line applications. The fourth embodiment is the same as the third embodiment but includes an additional, outermost plastic layer. Suitable plastics for this outermost layer include polyamides and polyesters.

Each of the embodiments described herein provides a multi-layer tubing assembly having at least one plastic-like layer, an adhesive layer and a rubber-like layer all coextrudable in one step. Prior art requirements of expensive and slow two step cross-head extrusion processes and vulcanization processes are eliminated.

Various features of the present invention have been described with reference to three embodiments. It should be understood that modification may be made without departing from the spirit and scope of the invention as represented by the following claims.

I claim:

1. A multi-layer tubing assembly comprising:
   an extruded innermost semi-conductive layer of a first fluoroplastic;
   an inner permeation-resistant layer of a second fluoroplastic coextruded around said innermost layer;
   an adhesive layer coextruded around said inner layer; and
   a cover layer of a rubber-like multiphase polymer coextruded around said adhesive layer.

2. A tubing assembly as claimed in claim 1 wherein said innermost layer has a surface resistivity of approximately $10^1$ to $10^6$ ohm/sq.

3. A tubing assembly as claimed in claim 2 wherein said innermost layer comprises 1% to 10% by weight of conductive carbon black.

4. A tubing assembly as claimed in claim 2 wherein said innermost layer comprises 1% to 10% by weight of a metallic conductive filler selected from the group consisting of silver, copper and steel.

5. A tubing assembly as claimed in claim 1 wherein said fluoroplastics are selected from a group consisting of ethylene tetrafluoroethylene, terpolymers of tetrafluoroethylene, hexafluoropropylene and vinylidene fluoride, and polyvinylidene fluoride.

6. A tubing assembly as claimed in claim 1 wherein said inner layer is extruded at temperatures below 600 degrees Fahrenheit.

7. A tubing assembly as claimed in claim 1 wherein said adhesive layer is comprised of a polymer blend having a multiphase morphology wherein one phase is miscible with said fluoroplastics and another phase is miscible with said rubber-like multiphase polymer.

8. A tubing assembly as claimed in claim 1 wherein said rubber-like multiphase polymer is selected from a group consisting of polymer blends or copolymers of polyamides, polyesters, polyurethane and matallocene polyolefins.

9. A tubing assembly as claimed in claim 8 wherein said rubber-like multiphase polymer has a hardness of approximately Shore A 50–98 and a tensile strength of approximately 3000–6000 psi.

10. A multi-layer tubing assembly comprising:
an extruded inner semi-conductive and permeation-resistant layer of a fluoroplastic;
an adhesive layer coextruded around said inner layer; and
a cover layer of a rubber-like multiphase polymer coextruded around said adhesive layer.

11. A tubing assembly as claimed in claim 10 wherein said inner layer has a surface resistivity of approximately $10^2$ to $10^6$ ohm/sq.

12. A tubing assembly as claimed in claim 11 wherein said inner layer comprises 1% to 10% by weight of conductive carbon black.

13. A tubing assembly as claimed in claim 12 wherein said inner layer is extruded at temperatures below 600 degrees Fahrenheit.

14. A tubing assembly as claimed in claim 10 wherein said fluoroplastic is selected from a group consisting of ethylene tetrafluoroethylene, terpolymers of tetrafluoroethylene, hexafluoropropylene and vinylidene fluoride, and polyvinylidene fluoride.

15. A tubing assembly as claimed in claim 10 wherein said adhesive layer is comprised of a polymer blend having a multiphase morphology wherein one phase is miscible with said fluoroplastic and another phase is miscible with said rubber-like multiphase polymer.

16. A tubing assembly as claimed in claim 10 wherein said rubber-like multiphase polymer is selected from a group consisting of polymer blends or copolymers of polyamides, polyesters, polyurethane and matallocene polyolefins.

17. A tubing assembly as claimed in claim 16 wherein said rubber-like multiphase polymer has a hardness of approximately Shore A 50–98 and a tensile strength of approximately 3000–6000 psi.

18. A multi-layer tubing assembly comprising:
an extruded inner permeation-resistant layer of a fluoroplastic;
an adhesive layer coextruded around said inner layer; and
a cover layer of a rubber-like multiphase polymer coextruded around said adhesive layer.

19. A tubing assembly as claimed in claim 18 wherein said inner layer is extruded at temperatures below 600 degrees Fahrenheit.

20. A tubing assembly as claimed in claim 18 wherein said fluoroplastic is selected from a group consisting of ethylene tetrafluoroethylene, terpolymers of tetrafluoroethylene, hexafluoropropylene and vinylidene fluoride, and polyvinylidene fluoride.

21. A tubing assembly as claimed in claim 18 wherein said adhesive layer is comprised of a polymer blend having a multiphase morphology wherein one phase is miscible with said fluoroplastic and another phase is miscible with said rubber-like multiphase polymer.

22. A tubing assembly as claimed in claim 18 wherein said rubber-like multiphase polymer is selected from a group consisting of polymer blends or copolymers of polyamides, polyesters, polyurethane and matallocene polyolefins.

23. A tubing assembly as claimed in claim 22 wherein said rubber-like multiphase polymer has a hardness of approximately Shore A 50–98 and a tensile strength of approximately 3000–6000 psi.

24. A tubing assembly as claimed in claim 18 and further comprising an outermost layer of a plastic coextruded around said cover layer.

25. A tubing assembly as claimed in claim 24 wherein said plastic is selected from the group consisting of polyamides and polyesters.

26. A four-layer tubing assembly for use in liquid fuel-line applications comprising:
an extruded innermost semi-conductive layer of a first fluoroplastic mixed with 1% to 10% by weight of conductive carbon black, said innermost layer having a surface resistivity in the range of $10^2$ to $10^5$ ohm/sq.;
an inner permeation-resistant layer of a second fluoroplastic coextruded around said innermost layer at a temperature below 600 degrees Fahrenheit;
an adhesive layer coextruded around said inner layer, said adhesive layer being a multiphase polymer blend wherein one phase is miscible with said fluoroplastics and another phase is miscible with a rubber-like multiphase polymer; and
a cover layer of said rubber-like multiphase polymer coextruded around said adhesive layer and having a hardness of approximately Shore A 50–98 and a tensile strength of approximately 3000–6000 psi.

27. A tubing assembly as claimed in claim 26 wherein said fluoroplastics are selected from a group consisting of ethylene tetrafluoroethylene, terpolymers of tetrafluoroethylene, hexafluoropropylene and vinylidene fluoride, and polyvinylidene fluoride, and said rubber-like multiphase polymer is selected from a group consisting of polymer blends or copolymers of polyamides, polyesters, polyurethane and matallocene polyolefins.

28. A three-layer tubing assembly for use in liquid fuel-line applications comprising:
an inner semi-conductive and permeation-resistant layer of a fluoroplastic mixed with 1% to 10% by weight of conductive carbon black, said inner layer having a surface resistivity in the range of $10^3$ to $10^5$ ohm/sq., and said inner layer being extruded at temperatures below 600 degrees Fahrenheit;
an adhesive layer coextruded around said inner layer, said adhesive layer being a multiphase polymer blend wherein one phase is miscible with said fluoroplastic and another phase is miscible with a rubber-like multiphase polymer; and
a cover layer of said rubber-like multiphase polymer coextruded around said adhesive layer and having a hardness of approximately Shore A 50–98 and a tensile strength of approximately 3000–6000 psi.

29. A tubing assembly as claimed in claim 28 wherein said fluoroplastic is selected from a group consisting of ethylene tetrafluoroethylene, terpolymers of tetrafluoroethylene, hexafluoropropylene and vinylidene fluoride, and polyvinylidene fluoride, and said rubber-like multiphase polymer is selected from a group consisting of polymer blends or copolymers of polyamides, polyesters, polyurethane and matallocene polyolefins.

30. A three-layer tubing assembly for use in vapor fuel-line applications comprising:

- an inner permeation-resistant layer of a fluoroplastic extruded at a temperature below 600 degrees Fahrenheit;
- an adhesive layer coextruded around said inner layer, said adhesive layer being a multiphase polymer blend wherein one phase is miscible with said fluoroplastic and another phase is miscible with a rubber-like multiphase polymer; and
- a cover layer of said rubber-like multiphase polymer coextruded around said adhesive layer and having a hardness of approximately Shore A 50–98 and a tensile strength of 3000–6000 ps.

31. A tubing assembly as claimed in claim 30 wherein said fluoroplastic is selected from a group consisting of ethylene tetrafluoroethylene, terpolymers of tetrafluoroethylene, hexafluoropropylene and vinylidene fluoride, and polyvinylidene fluoride, and said rubber-like multiphase polymer is selected from a group consisting of polymer blends or copolymers of polyamides, polyesters, polyurethane and matallocene polyolefins.

32. A four-layer tubing assembly for use in vapor fuel-line applications comprising:

- an inner permeation-resistant layer of a fluoroplastic extruded at a temperature below 600 degrees Fahrenheit;
- an adhesive layer coextruded around said inner layer, said adhesive layer being a multiphase polymer blend wherein one phase is miscible with said fluoroplastic and another phase is miscible with a rubber-like multiphase polymer;
- a cover layer of said rubber-like multiphase polymer coextruded around said adhesive layer and having a hardness of approximately Shore A 50–98 and a tensile strength of 3000–6000 psi; and
- an outermost layer of a plastic coextruded around said cover layer.

33. A tubing assembly as claimed in claim 32 wherein said fluoroplastic is selected from a group consisting of ethylene tetrafluoroethylene, terpolymers of tetrafluoroethylene, hexafluoropropylene and vinylidene fluoride, and polyvinylidene fluoride, said rubber-like multiphase polymer is selected from a group consisting of polymer blends or copolymers of polyamides, polyesters, polyurethane and matallocene polyolefins and said plastic is selected from a group consisting of polyamides and polyesters.

* * * * *